(12) United States Patent
Yang et al.

(10) Patent No.: US 9,819,221 B2
(45) Date of Patent: Nov. 14, 2017

(54) ONLINE UNINTERRUPTIBLE POWER SUPPLY TOPOLOGY

(71) Applicant: EATON MANUFACTURING LP, GLASGOW, SUCCURSALE DE MORGES, Vaud (CH)

(72) Inventors: Yuefeng Yang, Shenzhen (CN); Yilei Gu, Shenzhen (CN); Yuehui Li, Shenzhen (CN)

(73) Assignee: Eaton Corporation, Cleveland, OH (US)

( * ) Notice: Subject to any disclaimer, the term of this patent is extended or adjusted under 35 U.S.C. 154(b) by 162 days.

(21) Appl. No.: 14/429,380

(22) PCT Filed: Aug. 7, 2013

(86) PCT No.: PCT/CN2013/080952
§ 371 (c)(1),
(2) Date: Mar. 19, 2015

(87) PCT Pub. No.: WO2014/044089
PCT Pub. Date: Mar. 27, 2014

(65) Prior Publication Data
US 2016/0006295 A1    Jan. 7, 2016

(30) Foreign Application Priority Data

Sep. 20, 2012  (CN) .......................... 2012 1 0352113

(51) Int. Cl.
*H02J 9/00* (2006.01)
*H02J 9/06* (2006.01)
(Continued)

(52) U.S. Cl.
CPC  *H02J 9/06* (2013.01); *H02J 3/01* (2013.01); *H02J 7/34* (2013.01); *H02J 9/062* (2013.01);
(Continued)

(58) Field of Classification Search
CPC ........................................................ H02J 9/00
(Continued)

(56) References Cited

U.S. PATENT DOCUMENTS

2002/0109412 A1*  8/2002  Johnson, Jr. ............ H02J 9/061
                                                         307/66
2002/0118556 A1*  8/2002  Johnson, Jr. ............ H02J 9/061
                                                         363/123
(Continued)

FOREIGN PATENT DOCUMENTS

| CN | 2393249 | 8/2000 |
|---|---|---|
| CN | 1556573 | 12/2004 |

(Continued)

OTHER PUBLICATIONS

Lin et al. "Implementation of the AC/AC converter based on neutral-point switch-clamped topology", IEEE Proceedings Electrical Power Applications, vol. 150, No. 4, Jul. 2003; Publication Date: Apr. 10, 2003, pp. 455-463.
(Continued)

*Primary Examiner* — Rexford Barnie
*Assistant Examiner* — Joseph Inge

(57) ABSTRACT

An uninterruptible power supply (UPS) includes a rectifier circuit coupled to an AC input and configured to produce a DC voltage between first and second DC buses, an inverter circuit coupled to the first and second DC buses and configured to produce an AC voltage at the AC output. The UPS further includes an auxiliary power circuit comprising third and fourth DC buses configured to be coupled to a DC power source and third and fourth capacitors coupled between respective ones of the third and fourth DC buses and the neutral and respective first and second switches configured to couple and decouple respective ones of the third and fourth DC buses to and from respective ones of the first and second DC buses. The third and fourth capacitors may have (Continued)

capacitances greater than capacitances of the first and second capacitors.

16 Claims, 14 Drawing Sheets

(51) Int. Cl.
  *H02J 7/34* (2006.01)
  *H02M 3/04* (2006.01)
  *H02M 5/42* (2006.01)
  *H02J 3/01* (2006.01)
  *H02M 5/458* (2006.01)
  *H02M 7/487* (2007.01)

(52) U.S. Cl.
  CPC ............... *H02M 3/04* (2013.01); *H02M 5/42* (2013.01); *H02J 2009/063* (2013.01); *H02M 5/458* (2013.01); *H02M 7/487* (2013.01); *Y02E 40/40* (2013.01)

(58) Field of Classification Search
  USPC .......................................................... 307/66
  See application file for complete search history.

(56) References Cited

U.S. PATENT DOCUMENTS

| | | | | |
|---|---|---|---|---|
| 2004/0085785 | A1* | 5/2004 | Taimela | H02J 3/32 363/37 |
| 2005/0201127 | A1* | 9/2005 | Tracy | H02J 9/062 363/37 |
| 2011/0316336 | A1 | 12/2011 | Okubo et al. | |
| 2012/0044728 | A1* | 2/2012 | Yatsu | H02M 7/219 363/126 |
| 2012/0326514 | A1* | 12/2012 | Kim | H02J 9/005 307/66 |
| 2013/0076141 | A1* | 3/2013 | Paulakonis | H02J 7/345 307/66 |
| 2014/0111005 | A1* | 4/2014 | Liu | H02J 9/04 307/20 |

FOREIGN PATENT DOCUMENTS

CN 101521394 9/2009
EP 2020725 2/2009

OTHER PUBLICATIONS

European Search Report Corresponding to European Patent Application No. 13 83 8564; Dated: May 11, 2016; 7 Pages.

* cited by examiner

ONLINE UNINTERRUPTIBLE POWER SUPPLY TOPOLOGY

RELATED APPLICATIONS

The present application is a 35 U.S.C. §371 national phase application of PCT International Application No. PCT/CN2013/080952, having an international filing date of Aug. 7, 2013, claiming priority to Chinese Patent Application No. 201210352113.9, filed Sep. 20, 2012. The disclosures of each application are incorporated herein by reference in their entireties. The above PCT International Application was published in the Chinese language as International Publication No. WO 2014/044089.

TECHNICAL FIELD

The present invention relates to the field of switching power supply, and more particularly, relates to an online uninterruptible power supply (UPS).

BACKGROUND

An uninterruptible power supply (UPS) is a power supply apparatus for providing a load with uninterrupted, high-quality, reliable AC power, and having functions of protecting and monitoring the state of power supply in real time, which plays an important role in improving quality of power supply and ensuring normal operation of an apparatus. From perspectives of the circuit structure and mode of uninterrupted power supply, the UPS is mainly divided into two categories of a back-up type and an online type.

FIG. 1 exemplarily shows a configuration block diagram of a conventional online UPS. When the power of the grid is normal, an input AC voltage is converted into a DC voltage after rectified and filtered, to directly drive an inverter to power a load, while charging the battery. The inverter outputs an AC output voltage of regulated voltage and frequency to the load. When the power of the grid is abnormal or interrupted, the inverter converts the DC voltage supplied by the battery into the AC voltage, and supplies it to the load, so as to achieve uninterrupted power supply.

Based on the concept of the online UPS, a variety of circuit topologies and control methods have been developed. A topology of the conventional online UPS is shown in FIG. 2, which comprises two-stage power conversion, namely, a power factor correction (PFC) stage and an inverter stage. Due to presence of the two-stage power conversion, limited by the existing semiconductor and magnetic material technology, it is difficult to further improve the overall conversion efficiency. For example, if both power conversion stages are optimized in order to obtain an efficiency of 98%, the overall efficiency will drop to about 96%. Although such UPS topology comprises a highly-efficient bypass mode of opening a bypass switch and closing a power conversion stage, yet operation conditions of this mode are limited by many factors, which is too dependent on the quality of the input power of the grid.

There is still room for improving the online UPS.

SUMMARY OF THE INVENTION

An objective of the present invention is to provide a novel online UPS topology, in order to improve conversion efficiency of an online mode of the UPS. By ingenious bus capacitor configurations and novel control methods, a conventional DC bus voltage is replaced with an AC bus voltage, and at most one power conversion stage works at a high frequency switching state at one time, while other power converters only switch at zero crossing point of the power frequency cycle, so as to achieve a high-efficiency online UPS. Meanwhile, the novel online UPS topology of the present invention may retain the two-stage conversion operation mode (a double conversion mode), a battery operation mode and a bypass operation mode of the conventional UPS.

According to one embodiment of the present invention, a single-phase online uninterruptible power supply topology comprises a main power circuit and an auxiliary power circuit, wherein the main power circuit consists of an input stage, a power conversion stage, and an output stage connected successively; and the auxiliary power circuit consists of a charger, a battery and a DC/DC converter connected successively. The input stage of the main power circuit includes a first capacitor and a first inductor. The power conversion stage of the main power circuit includes first to fourth series branches connected in parallel between a positive bus and a negative bus. The first series branch consists of a first diode and a second diode connected in series, the second series branch consists of a second capacitor and a third capacitor connected in series, and a first switch is connected between an intermediate node of the first series branch and an intermediate node of the second series branch. The third series branch consists of a third switch, a fifth capacitor, a sixth capacitor, and a fourth switch connected in series successively, the intermediate node of the second series branch together with a node between the fifth capacitor and the sixth capacitor are grounded, the fourth series branch consists of a fifth switch and a sixth switch connected in series, the second switch is connected between the intermediate node of the second series branch and an intermediate node of the fourth series branch, and the third switch and the fourth switch respectively have a third diode and a fourth diode connected in parallel. The output stage of the main power circuit includes a second inductor and a fourth capacitor. The input of the charger of the auxiliary power circuit is connected to the AC input or positive and negative buses of the uninterruptible power supply. The output of the DC/DC converter of the auxiliary power circuit is connected to a node between the third switch and the fifth capacitor and a node between the sixth capacitor and the fourth switch. Therein, capacity of the second capacitor and the third capacitor is substantively less than capacity of the fifth capacitor and the sixth capacitor.

In a preferred embodiment, the second capacitor and the third capacitor are selected from a film capacitor and a ceramic capacitor, and the fifth capacitor and the sixth capacitor are electrolytic capacitors.

In a preferred embodiment, capacitance values of the second capacitor and the third capacitor may be below 50 µF.

In a preferred embodiment, in a case that the third switch and the fourth switch are disconnected, and the fifth capacitor and the sixth capacitor are pre-charged by the third diode and the fourth diode to a potential where the third diode and the fourth diode are turned off, the main power circuit is controlled to operate in modes of.

(1) A boost mode, wherein, the first switch is turned on/off at high frequency, the second switch is turned off, and the fifth switch and the sixth switch are turned on and off with a power frequency at a zero crossing point of an input voltage;

(2) A buck mode, wherein, the first switch is turned off, the second switch, the fifth switch and the sixth switch are turned on and off at a high frequency;

(3) A conduction mode, wherein, the first switch and the second switch are turned off, and the fifth switch and the sixth switch are turned on and off with the power frequency at the zero crossing point of the input voltage; or (4) A boost-buck mode, wherein, the main power circuit switches between the boost mode and the buck mode.

In a preferred embodiment, the main power circuit is controlled: to operate in the conduction mode, when the input voltage is within an tolerance range of a preset output voltage value, in one cycle of the input voltage; to operate in the boost mode, if an instantaneous value of the input voltage is less than the preset output voltage value; to operate in the buck mode, if the instantaneous value of the input voltage is greater than the preset output voltage value; and to operate in the boost-buck mode, if the instantaneous value of the input voltage is sometimes less than, and sometimes greater than, the preset output voltage value, when the input voltage is beyond the tolerance range of the preset output voltage value, in one cycle of the input voltage.

In a preferred embodiment, the main power circuit is controlled: to maintain a duty ratio of a driving signal of the corresponding switch switching at the high frequency unchanged in one cycle of the input voltage, if a waveform distortion of the input voltage is within the tolerance range.

In a preferred embodiment, the main power circuit is controlled as that: the first to third series branches constitute a power factor correction stage, and the fourth branch constitutes an inverter stage, in a case where the third switch and the fourth switch are on.

In a preferred embodiment, the third diode and the fourth diode may be bulk diodes of the third switch and the fourth switch per se, or may be discrete diodes of the third switch and the fourth switch.

The UPS topology and the control method of the present invention are also applicable to a two-phase or a three-phase online UPS, especially a three-phase UPS system having a common battery pack. In the two-phase or the three-phase online uninterruptible power supply topologies according to another embodiment of the present invention, each phase includes the main power circuit and the auxiliary power circuit as described above.

In a preferred embodiment, the auxiliary power circuit is shared by respective phases.

The novel online UPS according to the present invention may have four operation modes: (1) a high-efficiency operation mode; (2) a double conversion mode; (3) a battery mode; and, (4) a bypass mode as optional. Therein, the high-efficiency operation mode is peculiar to the present invention; and the present invention can also retain the double conversion mode, the battery mode, and even the bypass mode of the conventional online UPS. When there is no interrupt or serious distortion in the input AC voltage, the online UPS can operate in the high-efficiency operation mode, when the input AC power is interrupted or distorted to a certain extent, the online UPS can operate in the battery mode or in the double conversion mode. As compared with the switching from the bypass mode to the double conversion mode or the battery mode, the switching from the high-efficiency operation mode in the present invention to the double conversion mode or the battery mode is more quickly, seamlessly, and the output is not interrupted.

BRIEF DESCRIPTION OF THE DRAWINGS

With reference to the accompanying drawings, detailed description of the preferred embodiments will be given below, which will clearly explain these and other objectives, features and advantages of the present invention, in which.

DESCRIPTION OF THE EMBODIMENTS

The preferred embodiments for implementing the present invention will be introduced with reference to the accompanying drawings.

Figure 1:
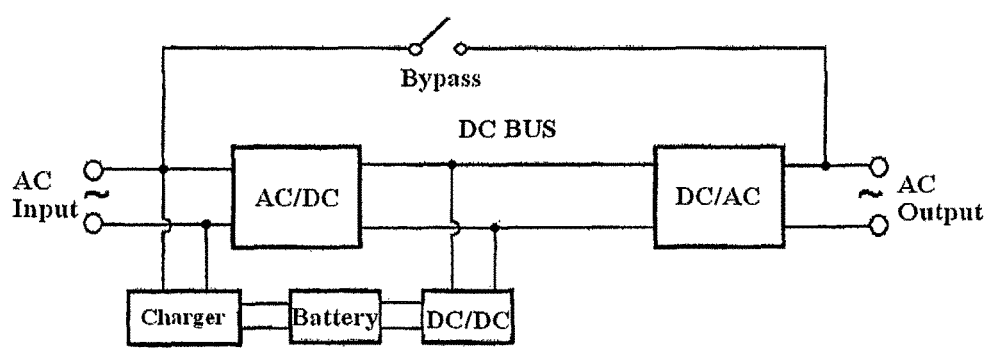
FIG. 1 is a exemplary configuration block diagram of a conventional online UPS.
Figure 2:
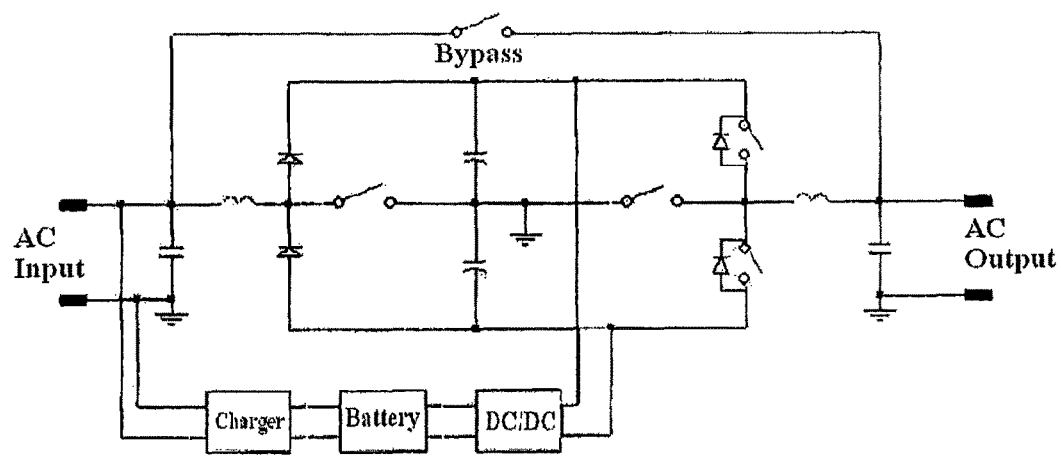
FIG. 2 is a topology of the conventional online UPS.
Figure 3:
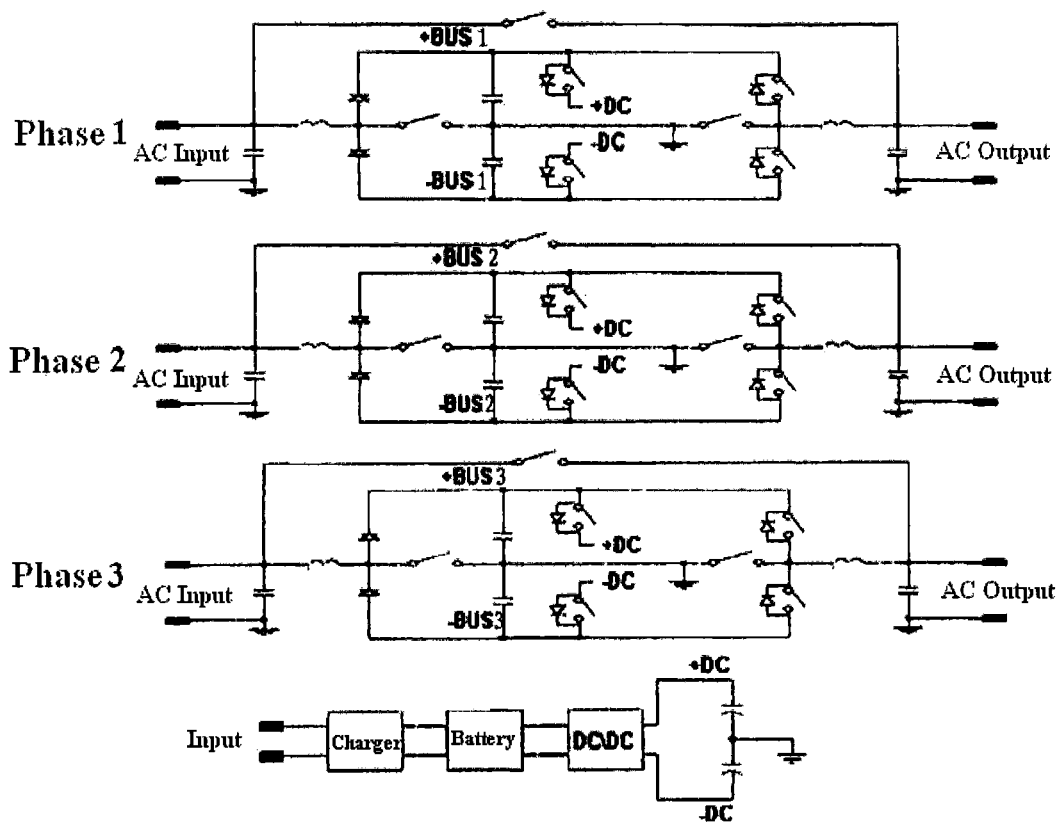
FIG. 3 is a three-phase online UPS topology according to an embodiment of the present invention.
Figure 4:
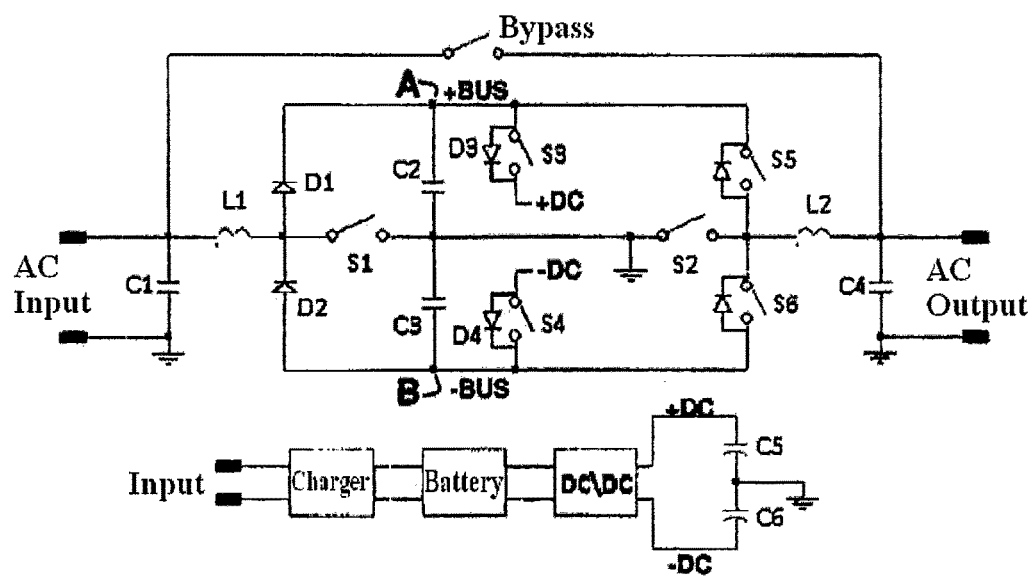
FIG. 4 is a single-phase online UPS topology according to an embodiment of the present invention.

FIG. 3 and FIG. 4 respectively illustrate topologies of a three-phase and a single-phase online UPS according to the embodiments of the present invention. For simplicity, hereinafter, application will be introduced for the single-phase UPS; however, all the results are equally applicable to applications of the three-phase or the two-phase UPS.

As shown in FIG. 4, the single-phase online uninterruptible power supply topology may comprise a main power circuit, an auxiliary power circuit and a bypass circuit as optional. The main power circuit consists of an input stage, a power conversion stage, and an output stage connected successively. The input stage of the main power circuit includes a first capacitor C1 and a first inductor L1. The power conversion stage of the main power circuit includes first to fourth series branches connected in parallel between a positive bus (+BUS) and a negative bus (−BUS). The first series branch consists of a first diode D1 and a second diode D2 connected in series, the second series branch consists of a second capacitor C2 and a third capacitor C3 connected in series, a first switch S1 is connected between an intermediate node of the first series branch and an intermediate node of the second series branch. The third series branch consists of a third switch S3, a fifth capacitor C5, a sixth capacitor C6, and a fourth switch S4 connected in series successively, the intermediate node of the second series branch together with a node between the fifth capacitor C5 and the sixth capacitor C6 are grounded, the fourth series branch consists of a fifth switch S5 and a sixth switch S6 connected in series, and the second switch S2 is connected between the intermediate node of the second series branch and an intermediate node of the fourth series branch. The third switch S3 and the fourth switch S4 respectively have a third diode D3 and a fourth diode D4 connected in parallel, for pre-charging the fifth capacitor C5 and the sixth capacitor C6 when the third switch S3 and the fourth switch S4 are turned off. The output stage of the main power circuit includes a second inductor L2 and a fourth capacitor C4.

The auxiliary power circuit consists of a charger, a battery and a DC/DC converter connected successively, wherein, configuration of the charger, the battery and the DC/DC converter is similar to that in the prior art, and the detailed description thereof is omitted here. An output of the DC/DC converter is connected to a node between the third switch S3 and the fifth capacitor C5 and a node between the sixth capacitor C6 and the fourth switch S4.

As optional, the novel online UPS according to the present invention may comprise a bypass circuit, for implementing a bypass operation. Configuration of the bypass circuit is similar to that in the prior art, and the detailed description thereof is omitted here.

One of the distinctions between the single-phase UPS topology shown in FIG. 4 and the conventional topology is the configuration of bus capacitor. In the conventional UPS, a large-capacity electrolytic capacitor is directly installed on the DC bus to filter out an AC voltage and store energy. In contrast, in the present invention, the second and the third capacitors C2 and C3 on the buses (+BUS and −BUS) are capacitors of relatively small capacity, which may not be electrolytic capacitors, but are respectively a single thin film capacitor or a ceramic capacitor, or may respectively consist of two or more thin film capacitors or ceramic capacitors connected in parallel; meanwhile, the capacitor C5 and the capacitor C6 of relatively large capacity can be connected to the buses (+BUS and −BUS) respectively via the switch S3 and the switch S4, which may respectively be single electrolytic capacitors, or may consist of two or more electrolytic capacitors connected in parallel. The capacity of the second capacitor C2 and the third capacitor C3 may be generally below 50 μF, depending on an actual frequency of a high-frequency switch; and the capacity of the fifth capacitor C5 and the sixth capacitor C6 is generally hundreds of μF or more. With this configuration, high-frequency switching ripples are filtered out with capacitors C2 and C3 of small capacity on the bus, to generate an AC bus voltage on the buses (+BUS and −BUS).

The switches S3 and S4 are respectively connected with the diodes D3 and D4 along a direction shown in the drawings. By controlling the switches S3 and S4, the online UPS in the present invention can operate in the high efficiency mode. In the high efficiency mode, firstly, the switches S3 and S4 connecting with the electrolytic capacitors C5 and C6 are turned off, the electrolytic capacitors C5 and C6 are pre-charged respectively via the diodes D3 and D4, and then enter into the high-efficiency operation mode. When the switches S3 and S4 connecting with the electrolytic capacitors C5 and C6 are turned on, the UPS can operate in the conventional double conversion mode or the battery mode.

The S1-S6 in FIG. 4 may be mechanical switches or MOSFET, IGBT, etc., which are the conventional switching devices used in the art, and filtering devices L1, L2, C1 and C4 are similar to those of the conventional UPS in terms of device selection and parameter selection.

With the above-described changes to the conventional online UPS in a hardware structure, and software update in control modes, the novel online UPS proposed by the present invention can be achieved at low cost. The control and operation modes of the novel online UPS according to the present invention will be introduced with reference to FIG. 5-FIG. 8.

When the switching devices S3 and S4 are turned on, there is no substantial difference between the structure and the operation of the online UPS according to the present invention and the UPS in the prior art; only in a case where the switching devices S3 an S4 are turned off, it enters into the high-efficiency operation mode peculiar to the present invention. Via the diodes D3 and D4, voltage on the electrolytic capacitors C5 and C6 is pre-charged to a maximum value (a peak value) of a half wave sine of the nodes A and B; and thereafter, the electrolytic capacitors C5 and C6 are maintained at this maximum voltage value, and the diodes D3 and D4 are turned off and no longer conduct current.

In the high-efficiency operation mode, there are four possible operation states:

[Type One] Boost Mode

Figure 5A:
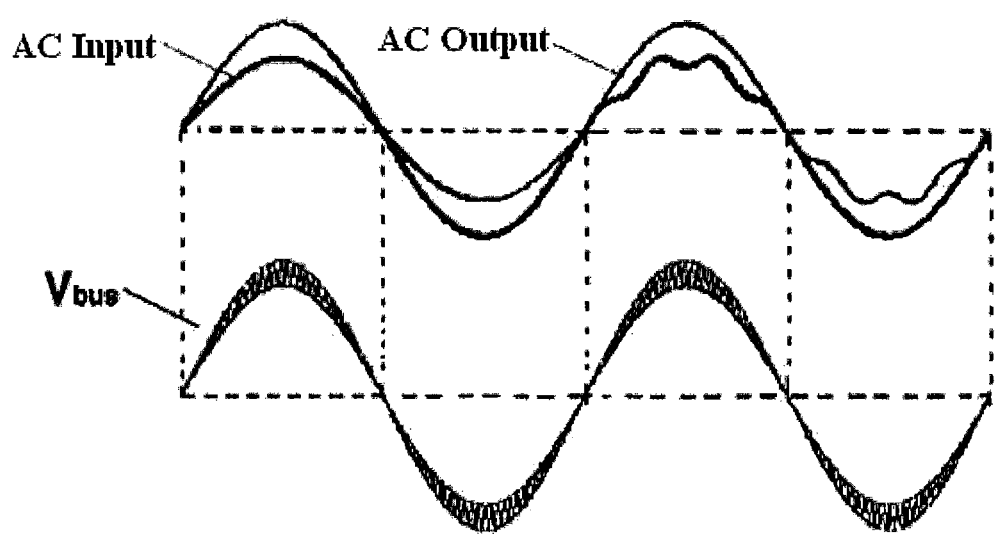
FIG. 5(A)-FIG. 5(C) are input and output voltage waveforms, current conduction paths and control block diagrams of a single-phase online UPS according to the embodiment of the present invention in a boost mode.
Figure 5B:
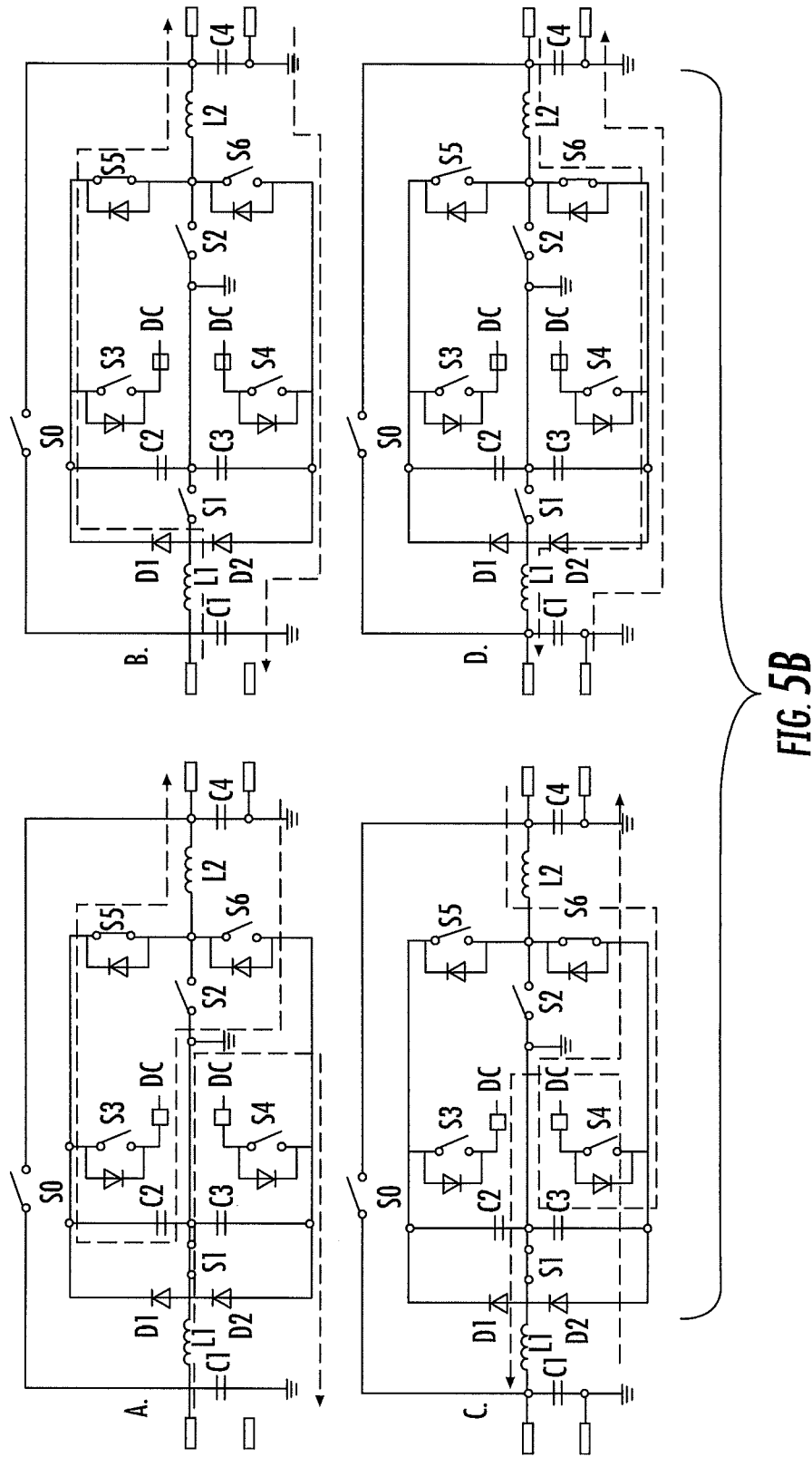
Figure 5C:
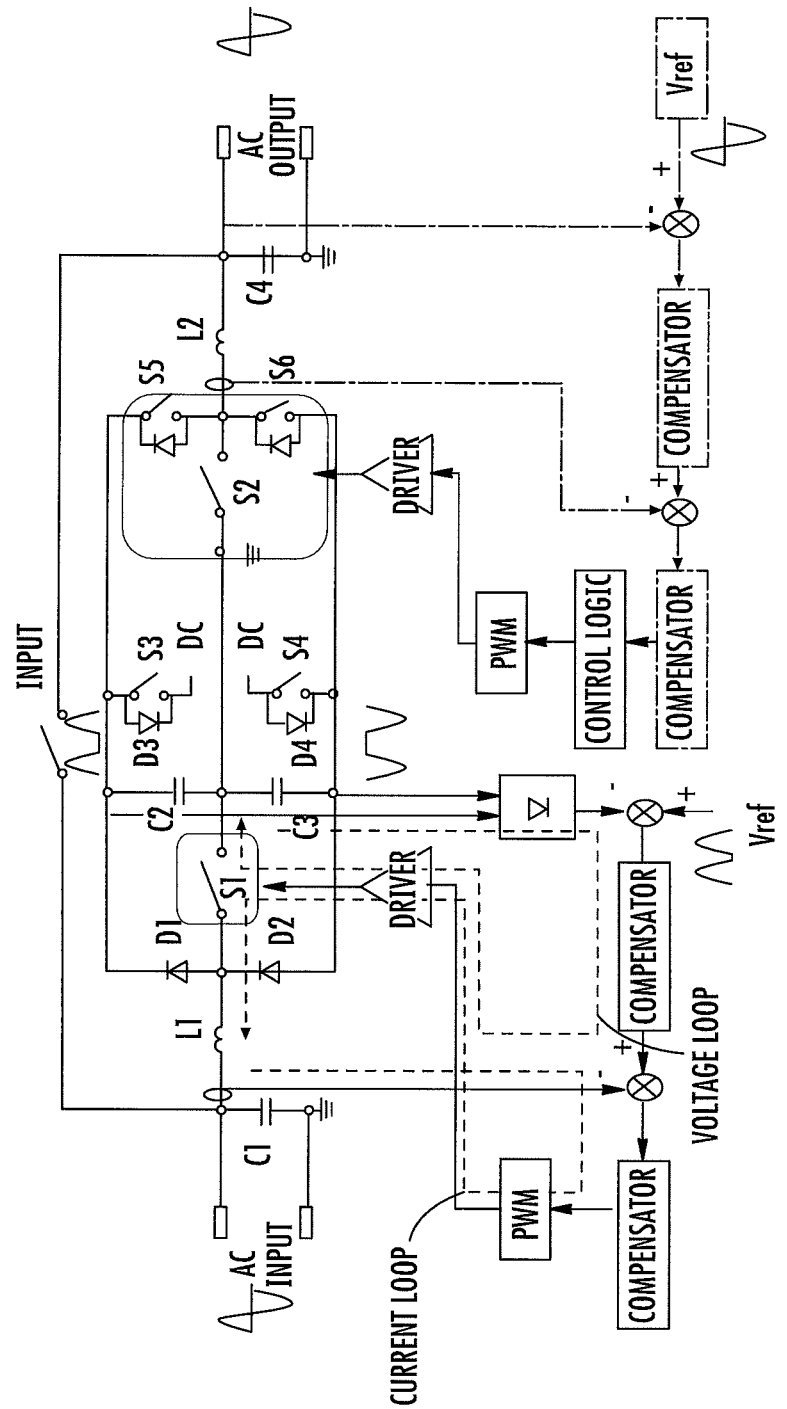

When an input AC voltage is below a preset output voltage value, it enters into the boost mode. In this operation mode, input and output voltage waveforms are shown in FIG. 5(A), current conduction paths are shown in FIG. 5(B), and control block diagrams are shown in FIG. 5(C).

In the boost mode, the first switch S1 is turned on/off at a high frequency, the second switch S2 is turned off, and the fifth switch S5 and the sixth switch S6 are turned on/off with a power frequency at a zero crossing point of an input voltage.

It can be seen that, the main power circuit in the boost mode includes two stages, a first stage for achieving a rectifier/boost function, and a second stage for converting. Specifically, the first stage increases an input voltage of the grid to a desired output voltage value, and filters out a harmonic voltage in a case where the input voltage contains harmonics, and respectively generates positive and negative half wave sinusoidal voltage on the +/−BUS; since C2 and C3 may not completely filter out high-frequency switching ripple current, the positive and negative half wave sinusoidal voltages on the +/−BUS may contain a little high-frequency switching frequency harmonics. The second stage converts the half wave sinusoidal voltage on the +/−BUS to a sinusoidal AC voltage, and filters out harmonics of the switching frequency thereon, to output a high-quality sinusoidal voltage.

[Type Two] Buck Mode

Figure 6A:
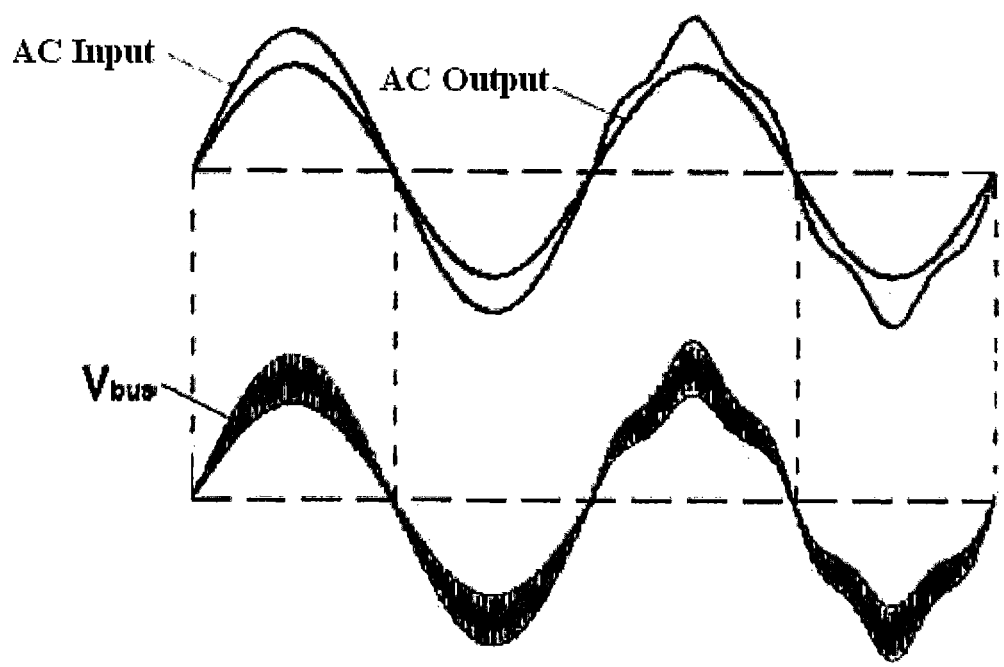
FIG. 6(A)-FIG. 6(C) are input and output voltage waveforms, current conduction paths and control block diagrams of a single-phase online UPS according to the embodiment of the present invention in a buck mode.
Figure 6B:
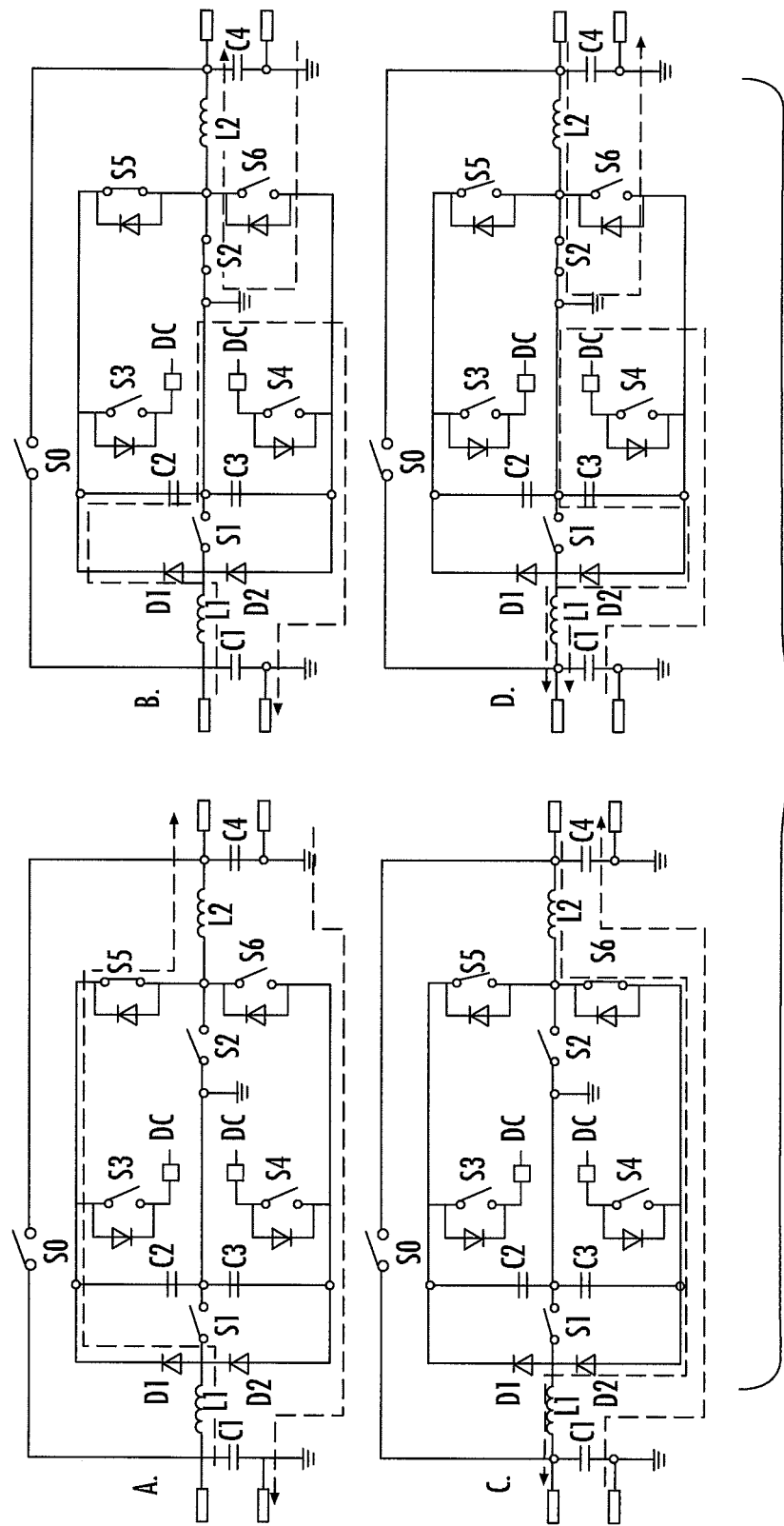
Figure 6C:
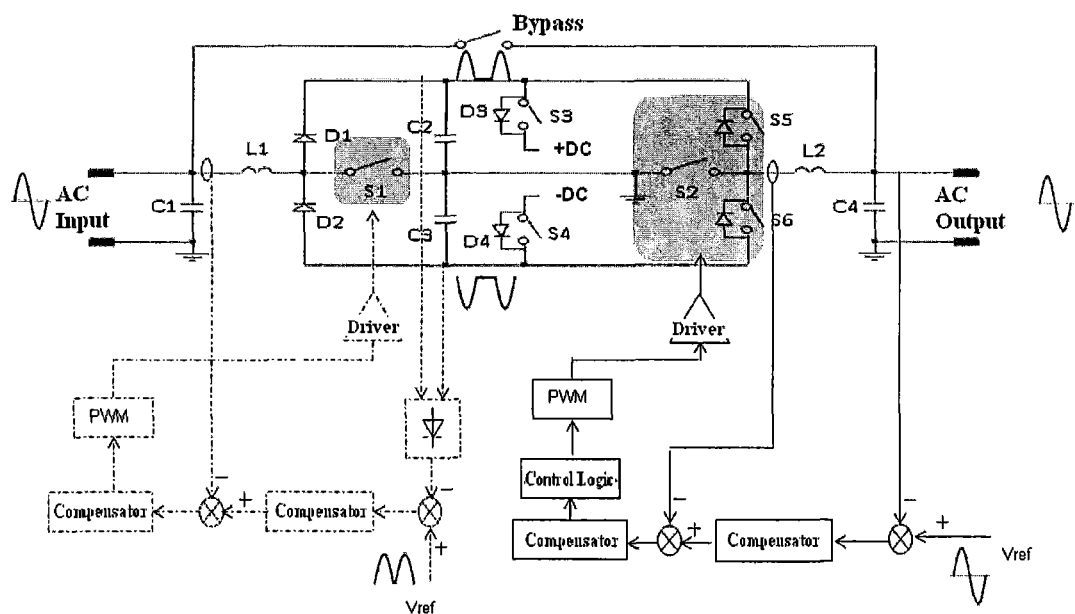

When the input AC voltage is higher than the preset output voltage value, it enters into the buck mode. In this operation mode, the input and output voltage waveforms are shown in FIG. 6(A), the current conduction paths are shown in FIG. 6(B), and the control block diagrams are shown in FIG. 6(C).

In the buck mode, the first switch S1 is turned off, the second switch S2, the fifth switch S5 and the sixth switch S6 are turned on/off at a high frequency;

It can be seen that, the main power circuit in the buck mode includes a first stage for achieving a rectifier function, and a second stage for achieving a buck/conversion function. Specifically, the diodes D1 and D2 in the first stage rectify the input voltage of the grid, to respectively generate positive and negative half wave sinusoidal voltages on the +/−BUS. The second stage reduces and converts the half wave sinusoidal voltage on the +/−BUS to a desired output voltage value, and filters out a harmonic voltage in a case where the input voltage contains harmonics, to convert and output a high-quality sinusoidal voltage.

[Type Three] Conduction Mode

Figure 7A:
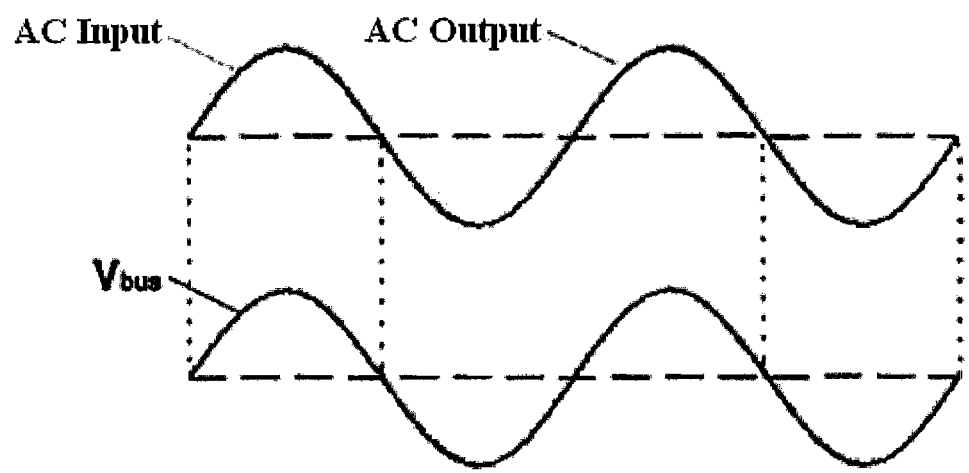
FIG. 7(A)-FIG. 7(C) are input and output voltage waveforms, current conduction paths and control block diagrams of a single-phase online UPS according to the embodiment of the present invention in a conduction mode.
Figure 7B:
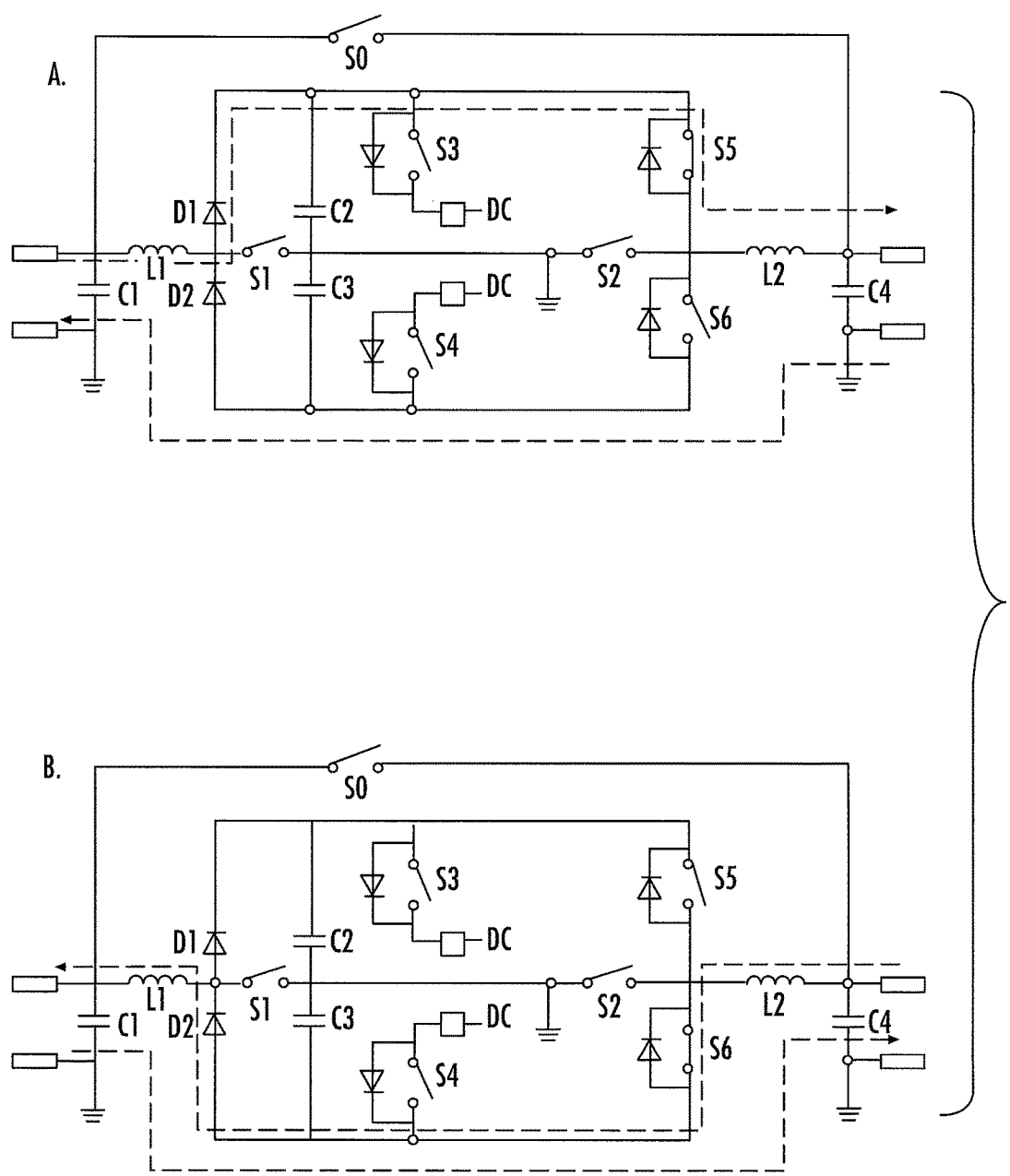
Figure 7C:
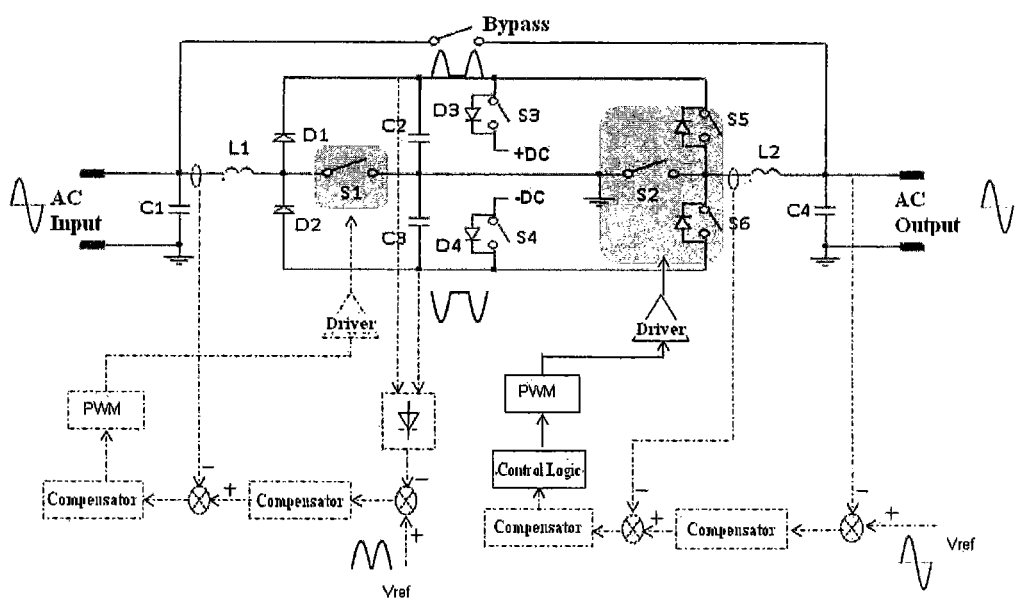

When the input AC voltage is within a tolerance range of the preset output voltage value, it enters into the conduction mode. In this operation mode, the input and output voltage waveforms are shown in FIG. 7(A), the current conduction paths are shown in FIG. 7(B), and the control block diagrams are shown in FIG. 7(C).

In the conduction mode, the first switch S1 and the second switch S2 are turned off, and the fifth switch S5 and the sixth switch S6 are turned on/off with a power frequency at a zero crossing point of an input voltage.

It can be seen that, the main power circuit in the conduction mode includes a first stage for achieving a rectifier function, and a second stage for achieving a conversion function. Specifically, the diodes D1 and D2 in the first stage rectify the input voltage of the grid, to respectively generate positive and negative half wave sinusoidal voltages on the +/−BUS. The second stage coverts the half wave sinusoidal voltage on the +/−BUS to a sinusoidal AC voltage and outputs the same. In this case, there is no power stage operating at high frequency.

[Type Four] Boost-Buck Mode

Figure 8:
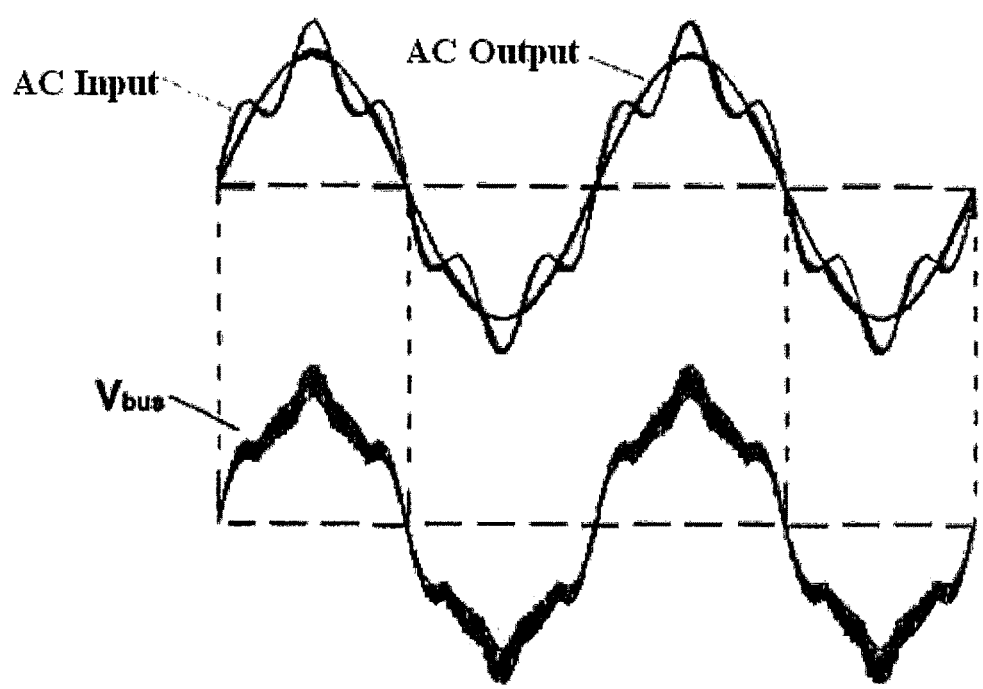
FIG. 8 is an input and output voltage waveform of a single-phase online UPS according to the embodiment of the present invention in a boost-buck mode.

When the input AC voltage is sometimes higher, and sometimes lower than the preset voltage value, it enters into the boost-buck mode, at this time, the UPS alternates between the boost mode and the buck mode; and the input and output voltage waveforms are shown in FIG. 8.

The main power circuit in the boost-buck mode includes: (1) A first stage, which increases and rectifies the input voltage in one power frequency cycle of power of the grid, when the input voltage is lower than the desired output voltage, and only rectifies it when the input voltage is equal to or higher than the desired output voltage, to generate positive and negative half wave sinusoidal voltages on the +−BUS. (2) A second stage: which reduces and coverts the +−BUS voltage in one power frequency cycle of power of the grid, when the input voltage is higher than the desired output voltage, and outputs the same, and only converts and outputs the voltage when the input voltage is equal to or lower than the desired output voltage.

Thus, the online UPS according to the present invention has at most one stage to operate at high frequency at any time. When the AC input voltage is within an tolerance range of the preset output voltage value, the two stages of converters both operate in the power frequency state, when the AC input voltage deviates from the tolerance range of the preset output voltage value, at most one converter operates in the high frequency switch state, whereas the remaining converters operate in the power frequency state, so that the operation efficiency of the UPS is greatly improved.

It should be noted that the control block diagrams shown in FIG. 5(C), FIG. 6(C) and FIG. 7 (C) are simple functional schematic diagrams, which diagrammatically represent some functions involved in the present invention, wherein, a doted dash line drawing indicates that the corresponding parts are in an inactive state under the current operation condition. From these functional schematic diagrams, those skilled in the art can appropriately implement control of the online UPS of the present invention by a combination of software and hardware. With regard to respective functional modules in the control block diagrams, for example, the driver may be partially implemented by hardware; voltage and current sampling parts may be implemented by a combination of software and hardware; and other parts may be implemented in software; however, the present invention is not limited thereto, and those skilled in the art can use other configurations when practicing the inventive concept of the present invention.

For example, in the control mode of the online UPS according to the present invention, firstly, it can be determined whether it operates in the double conversion mode or in the high-efficiency operation mode according to a degree of distortion of the input voltage waveform; if there is serious distortion, the UPS operates in the double conversion mode; otherwise, the UPS may operate in the high-efficiency operation mode. The acceptable degree of distortion in the high-efficiency operation mode may be different according to different environments of application, and usually, a range of, for example, a total voltage harmonic content (THDv)≤+/−10%, can be selected.

Secondly, in the high-efficiency operation mode, an instantaneous value of the input voltage is compared with the preset output voltage value, and it is further decided whether the UPS operates in the boost mode, the buck mode, the conduction mode or the boost-buck mode, according to a comparison result between the instantaneous value of the input voltage and the preset output voltage value. Here, the boost mode, the buck mode, the conduction mode and the boost-buck mode all refer to the operation modes within a power frequency cycle. For example, in a power frequency cycle, the instantaneous value of the input voltage is sometimes higher than the preset value, and sometimes lower than the preset value, then the converter sometimes needs to increase the voltage and sometimes needs to reduce the voltage, and the boost-buck mode is selected. In a preferred embodiment, the tolerance range of the preset output voltage value may be selected as, for example, +/−10%.

When the UPS operates in the boost mode, the buck mode and the boost-buck mode under the high-efficiency operation mode, if the waveform distortion of the input voltage is within the tolerance range (including a case where a pure sinusoidal waveform or distortion is very small), the duty ratio of the driving signal of the switch operating at the high frequency may be unchanged within one power frequency cycle.

The conventional PFC converter, in order to achieve a relatively high power factor, mainly regulates an input current, so as to track a waveform and a phase of the input voltage. Therefore, a regulating rate of a current control loop is very fast, and a bandwidth thereof is much greater than (10 times or more of) the power frequency; otherwise, it fails to track the input voltage. However, if the regulating rate of the voltage loop is relatively slow, and the bandwidth thereof is less than the power frequency, its purpose is to filter out 2 times of the power frequency voltage harmonics in the DC voltage, and to prevent the same from mixing into a current loop to cause an input current distortion. In contrast, two control loops, i.e., a voltage outer loop and a current inner loop (e.g., as shown in FIG. 5(C)) are used for control in the present invention. In the converter of the present invention, since the capacity of the output capacitors C2 and C3 is very small, a non-linear influence on the input current can be ignored, the input current will automatically track the input voltage; and since it is mainly to quickly regulate the instantaneous value of the output voltage, the controlled bandwidth of the voltage loop is higher than the power frequency. With respect to the power frequency, the voltage loop can quickly regulate the output voltage, to achieve a desired output waveform of the preset value.

In addition, in the high frequency mode, parameters of a loop compensator are different from parameters in the conventional mode, which can be easily implemented in software.

The concept of the present invention is applicable to the single-phase UPS, the two-phase or the three-phase UPS without using a common charger, a battery, and a DC/DC converter, and is also applicable to the two-phase and the three-phase UPS using a common charger, a battery, and a DC/DC converter. Generally, in order to simplify the system structure and reduce the cost, the common charger, the battery, and the DC/DC converter may be shared by the phases.

Although the online UPS topology and a control thereof according to the present invention are introduced with reference to the preferred embodiments, yet those skilled in that art know that various changes, modifications and substitutions can be made to the details diagramed and described without departing from the spirit and scope of the invention. For example, the input of the charger of the auxiliary power circuit may not be connected to the AC input, but is connected to the buses (+BUS, −BUS). Accordingly, the scope of the present invention is not limited to the embodiments as specifically described above, but is limited by the attached claims and all contents equivalent thereto to a full extent.

What is claimed is:

1. An uninterruptible power supply comprising:
a main power circuit comprising an input stage, a power conversion stage, and an output stage and an auxiliary power circuit comprising a charger, a battery and a DC/DC converter;
wherein the input stage of the main power circuit includes a first capacitor and a first inductor;
wherein the power conversion stage of the main power circuit includes first, second, third, and fourth series branches connected in parallel between a positive bus and a negative bus, the first series branch comprises a first diode and a second diode connected in series, the second series branch comprises a second capacitor and a third capacitor connected in series, a first switch is connected between an intermediate node of the first series branch and an intermediate node of the second series branch, a second switch is connected between the intermediate node of the second series branch and an intermediate node of the fourth series branch, the third series branch comprises a third switch, a fifth capacitor, a sixth capacitor, and a fourth switch connected in series, the intermediate node of the second series branch together with a node between the fifth capacitor and the sixth capacitor are grounded, the fourth series branch comprises a fifth switch and a sixth switch connected in series, and the third switch and the fourth switch respectively have a third diode and a fourth diode connected in parallel;
wherein the output stage of the main power circuit includes a second inductor and a fourth capacitor;
wherein an input of the charger of the auxiliary power circuit is connected to an AC input or positive and negative buses of the uninterruptible power supply, and an output of the DC/DC converter of the auxiliary power circuit is connected to a node between the third switch and the fifth capacitor and a node between the sixth capacitor and the fourth switch; and
wherein a capacitance of the second capacitor and the third capacitor is substantively less than a capacitance of the fifth capacitor and the sixth capacitor.

2. The uninterruptible power supply according to claim 1, wherein the second capacitor and the third capacitor are selected from a film capacitor and a ceramic capacitor, and the fifth capacitor and the sixth capacitor are electrolytic capacitors.

3. The uninterruptible power supply according to claim 1, wherein capacitance values of the second capacitor and the third capacitor are below 50μF.

4. The uninterruptible power supply according to claim 1, wherein in a case that the third switch and the fourth switch are turned off, and the fifth capacitor and the sixth capacitor are pre-charged via the third diode and the fourth diode respectively to a potential where the third diode and the fourth diode are turned off, the main power circuit is controlled to operate in modes of:

(1) a boost mode, wherein the first switch is turned on/off at a high frequency, the second switch is turned off, and the fifth switch and the sixth switch are turned on/off with a power frequency at a zero crossing point of an input voltage;
(2) a buck mode, wherein the first switch is turned off, the second switch, the fifth switch and the sixth switch are turned on/off at a high frequency;
(3) a conduction mode, wherein the first switch and the second switch are turned off, and the fifth switch and the sixth switch are turned on/off with the power frequency at the zero crossing point of the input voltage; or
(4) a boost-buck mode, wherein the main power circuit switches between the boost mode and the buck mode.

5. The uninterruptible power supply according to claim 4, wherein the main power circuit is controlled:
to operate in the conduction mode, when the input voltage is within a tolerance range of a preset output voltage value, in one cycle of the input voltage;
to operate in the boost mode, if an instantaneous value of the input voltage is less than the preset output voltage value; to operate in the buck mode, if the instantaneous value of the input voltage is greater than the preset output voltage value; and to operate in the boost-buck mode, if the instantaneous value of the input voltage is sometimes less than, and sometimes greater than, the preset output voltage value, when the input voltage is beyond the tolerance range of the preset output voltage value, in one cycle of the input voltage.

6. The uninterruptible power supply according to claim 4, wherein the main power circuit is controlled: to maintain a duty ratio of a driving signal of a corresponding switch switching at the high frequency unchanged in one cycle of the input voltage, if a waveform distortion of the input voltage is within a tolerance range.

7. The uninterruptible power supply according to claim 1, wherein the main power circuit is controlled as that: the first to third series branches constitute a power factor correction stage, and the fourth branch constitutes an inverter stage, in a case that the third switch and the fourth switch are turned on.

8. The uninterruptible power supply according to claim 1, wherein the third diode and the fourth diode are bulk diodes of the third switch and the fourth switch or are discrete diodes.

9. The uninterruptible power supply according to claim 1, wherein the auxiliary power circuit is shared by respective phases.

10. An uninterruptible power supply comprising:
an AC input;
an AC output;
first and second DC buses;
a neutral;
first and second capacitors coupled between respective ones of the first and second DC buses and the neutral;
a rectifier circuit coupled to the AC input and configured to produce a DC voltage between the first and second DC buses;
an inverter circuit coupled to the first and second DC buses and configured to produce an AC voltage at the AC output;
an auxiliary power circuit comprising third and fourth DC buses configured to be coupled to a DC power source and third and fourth capacitors coupled between respective ones of the third and fourth DC buses and the neutral, wherein the third and fourth capacitors have capacitances greater than capacitances of the first and second capacitors; and respective first and second switches configured to couple and decouple respective ones of the third and fourth DC buses to and from respective ones of the first and second DC buses.

11. The uninterruptible power supply of claim 10, further comprising first and second diodes coupled in parallel with respective ones of the first and second switches.

12. The uninterruptible power supply of claim 10, wherein the DC power source comprises a DC/DC converter circuit.

13. The uninterruptible power supply of claim 10, wherein the rectifier circuit comprises a boost rectifier circuit and wherein the inverter circuit comprises a buck inverter circuit.

14. The uninterruptible power supply of claim 10, wherein the AC input is configured to be coupled to an AC power source and wherein the rectifier circuit and the inverter circuit support the following modes of operation when the first and second switches couple the third and fourth DC buses to the first and second DC buses:
  a first mode in which power is transferred from the AC input to the AC output via the rectifier circuit, the first and second DC buses, and the inverter circuit; and
  a second mode in which power is transferred from the DC power source to the AC output via the third and fourth DC buses, the first and second DC buses, and the inverter circuit.

15. An uninterruptible power supply comprising:
an AC input;
an AC output;
first and second DC buses;
a neutral;
first and second capacitors coupled between respective ones of the first and second DC buses and the neutral;
a rectifier circuit coupled to the AC input and configured to produce a DC voltage between the first and second DC buses;
an inverter circuit coupled to the first and second DC buses and configured to produce an AC voltage at the AC output;

an auxiliary power circuit comprising third and fourth DC buses configured to be coupled to a DC power source and third and fourth capacitors coupled between respective ones of the third and fourth DC buses and the neutral; and respective first and second switches configured to couple and decouple respective ones of the third and fourth DC buses to and from respective ones of the first and second DC buses, wherein the rectifier circuit comprises:
a first inductor coupled to the AC input;
first and second diodes coupled between the first inductor and respective ones of the first and second DC buses; and
a third switch configured to couple and decouple the first inductor to and from the neutral; and wherein the inverter circuit comprises:
  a second inductor coupled to the AC output;
  fourth and fifth switches configured to couple and decouple respective ones of the first and second DC buses to and from the second inductor; and
  a sixth switch configured to couple and decouple the second inductor to and from the neutral.

16. The uninterruptible power supply of claim 15, wherein the rectifier circuit and the inverter circuit support the following modes of operation when the first and second switches decouple the third and fourth DC buses from the first and second DC buses:
  a boost mode wherein the third switch is modulated to generate the DC voltage between the first and second DC buses from an AC voltage at the AC input, the sixth switch is open and the fourth and fifth switches are modulated to generate the AC voltage at the AC output;
  a buck mode wherein the third switch is open and the first and second diodes rectify the AC voltage at the AC input to generate the DC voltage and the fourth, fifth and sixth switches are modulated to generate the AC voltage at the AC output; and
  a conduction mode wherein the third and sixth switches are open and the fifth and sixth switch switches are modulated at or near zero crossings of the AC voltage at the AC input to generate the AC voltage at the AC output.

* * * * *